(12) United States Patent
Tu et al.

(10) Patent No.: US 10,450,461 B2
(45) Date of Patent: Oct. 22, 2019

(54) CROSSLINKABLE POLYARYLENE SULFIDE COMPOSITION

(71) Applicant: Ticona LLC, Florence, KY (US)

(72) Inventors: Xiaoyan Tu, Florence, KY (US); Kent Miller, Lexington, KY (US); Jared T. Kindt, Union, KY (US); Rong Luo, Florence, KY (US); Xinyu Zhao, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 15/373,945

(22) Filed: Dec. 9, 2016

(65) Prior Publication Data

US 2017/0166747 A1    Jun. 15, 2017

Related U.S. Application Data

(60) Provisional application No. 62/266,210, filed on Dec. 11, 2015.

(51) Int. Cl.
| | |
|---|---|
| *C08L 81/04* | (2006.01) |
| *C08L 81/02* | (2006.01) |
| *B32B 15/08* | (2006.01) |
| *B65D 1/34* | (2006.01) |
| *C08L 33/06* | (2006.01) |
| *C08L 63/10* | (2006.01) |
| *B32B 15/00* | (2006.01) |

(52) U.S. Cl.
CPC .............. *C08L 81/02* (2013.01); *B32B 15/08* (2013.01); *B65D 1/34* (2013.01); *C08L 2201/08* (2013.01); *C08L 2205/06* (2013.01); *C08L 2312/00* (2013.01)

(58) Field of Classification Search
CPC ................. C08L 81/02; C08L 81/04

USPC ........................................................ 428/457
See application file for complete search history.

(56) References Cited

U.S. PATENT DOCUMENTS

| | | |
|---|---|---|
| 4,418,029 A | 11/1983 | Reed et al. |
| 4,708,983 A | 11/1987 | Liang |
| 4,871,810 A | 10/1989 | Saltman |
| 5,011,887 A | 4/1991 | Sasaki et al. |
| 5,071,907 A | 12/1991 | Nakata et al. |
| 5,157,070 A | 10/1992 | Orikasa et al. |

(Continued)

FOREIGN PATENT DOCUMENTS

| | | |
|---|---|---|
| CN | 1718635 A | 1/2006 |
| CN | 103554914 A | 2/2014 |

(Continued)

OTHER PUBLICATIONS

Paper—Ryan et al., "Ultra High Molecular Weight Functional Siloxane Additives in Polymers: Effects on Processing and Properties," *Dow Corning*, 2001, 16 pages.

(Continued)

*Primary Examiner* — Duc Truong
(74) *Attorney, Agent, or Firm* — Dority & Manning, P.A.

(57) ABSTRACT

A polymer composition that can exhibit excellent strength and flexibility under a variety of different conditions is provided. More particularly, the polymer composition contains a polyarylene sulfide, epoxy-functional polymeric impact modifier, and a crosslinking system that includes a metal carboxylate. In certain cases, the crosslinking system may also employ a crosslinking agent that is "multi-functional" to the extent that it contains at least two reactive, functional groups.

29 Claims, 3 Drawing Sheets

(56) References Cited

U.S. PATENT DOCUMENTS

| | | |
|---|---|---|
| 5,191,020 A | 3/1993 | Masamoto et al. |
| 5,219,920 A | 6/1993 | Yamamoto et al. |
| 5,258,450 A | 11/1993 | Nakata et al. |
| 5,270,375 A | 12/1993 | Yamamoto et al. |
| 5,281,665 A | 1/1994 | Fukui et al. |
| 5,288,798 A | 2/1994 | Koshirai et al. |
| 5,288,817 A | 2/1994 | Yamamoto et al. |
| 5,324,796 A | 6/1994 | Han |
| 5,604,287 A | 2/1997 | Yamao |
| 5,723,542 A | 3/1998 | Hwang et al. |
| 6,072,012 A | 6/2000 | Juen et al. |
| 6,166,137 A | 12/2000 | Brown et al. |
| 6,608,136 B1 | 8/2003 | Dean et al. |
| 6,699,946 B1 | 3/2004 | Lambla et al. |
| 6,849,697 B2 | 2/2005 | Lambla et al. |
| 6,960,628 B2 | 11/2005 | Matsuoka et al. |
| 7,173,090 B2 | 2/2007 | Akiyama et al. |
| 7,863,378 B2 | 1/2011 | Nishihara et al. |
| 7,960,473 B2 | 6/2011 | Kobayashi et al. |
| 8,324,308 B2 | 12/2012 | Kinouchi |
| 8,663,764 B2 | 3/2014 | Luo et al. |
| 8,703,029 B2 | 4/2014 | Takada et al. |
| 8,779,051 B2 | 7/2014 | Kisin et al. |
| 8,852,707 B2 | 10/2014 | Nishikawa et al. |
| 8,975,305 B2 | 3/2015 | Topolkaraev et al. |
| 9,074,096 B2 | 7/2015 | Okubo et al. |
| 9,493,646 B2 | 11/2016 | Luo et al. |
| 9,494,260 B2 | 11/2016 | Luo et al. |
| 9,494,262 B2 | 11/2016 | Luo et al. |
| 9,611,388 B2 | 4/2017 | Watanabe et al. |
| 9,650,515 B2 | 5/2017 | Kang et al. |
| 9,718,225 B2 | 8/2017 | Luo et al. |
| 9,758,674 B2 | 9/2017 | Luo et al. |
| 9,771,465 B2 | 9/2017 | Ichinose et al. |
| 9,938,407 B2 | 4/2018 | Unohara et al. |
| 2013/0035440 A1 | 2/2013 | Nishikawa et al. |
| 2013/0269977 A1 | 10/2013 | Luo et al. |
| 2014/0316041 A1 | 10/2014 | Mehta |
| 2015/0197605 A1 | 7/2015 | Lee et al. |
| 2015/0225547 A1 | 8/2015 | Tu et al. |
| 2015/0225567 A1 | 8/2015 | Miller et al. |
| 2017/0058124 A1 | 3/2017 | Luo et al. |
| 2017/0059062 A1 | 3/2017 | Luo et al. |
| 2017/0096557 A1 | 4/2017 | Ohnishi et al. |
| 2017/0121525 A1 | 5/2017 | Luo et al. |
| 2017/0166748 A1 | 6/2017 | Luo et al. |
| 2017/0369705 A1 | 12/2017 | Luo et al. |
| 2018/0015648 A1 | 1/2018 | Luo et al. |

FOREIGN PATENT DOCUMENTS

| | | |
|---|---|---|
| CN | 103965642 A | 8/2014 |
| CN | 104672903 A | 6/2015 |
| DE | 4016059 A1 | 11/1991 |
| EP | 0 288 308 B1 | 4/1988 |
| EP | 0 389 905 A1 | 10/1990 |
| EP | 0 473 962 B1 | 8/1991 |
| EP | 0 480 426 A1 | 10/1991 |
| EP | 0 732 366 A2 | 9/1996 |
| EP | 3 252 106 A1 | 12/2017 |
| JP | S 6227359 | 2/1987 |
| JP | S 62268612 | 11/1987 |
| JP | S 63189457 | 8/1988 |
| JP | H 01240566 | 9/1989 |
| JP | H 02225565 | 9/1990 |
| JP | H 02286746 | 11/1990 |
| JP | H 03140368 | 6/1991 |
| JP | H 0472356 | 3/1992 |
| JP | H 059385 | 1/1993 |
| JP | H 06239972 | 8/1994 |
| JP | H 0753869 | 2/1995 |
| JP | H 08337719 | 12/1996 |
| JP | H 11130961 | 5/1999 |
| JP | H 11349813 | 12/1999 |
| JP | 2000001615 | 1/2000 |
| JP | 2000103963 | 4/2000 |
| JP | 2000186209 | 7/2000 |
| JP | 2004217895 A | 8/2004 |
| JP | 2006045390 | 2/2006 |
| JP | 2006328291 | 12/2006 |
| JP | 2008144002 | 6/2008 |
| JP | 2008260830 | 10/2008 |
| JP | 2010505025 | 2/2010 |
| JP | 2011016942 A | 1/2011 |
| JP | 2011026439 | 2/2011 |
| JP | 5339912 B2 | 11/2013 |
| JP | 2014177571 | 9/2014 |
| JP | 2014189573 | 10/2014 |
| JP | 2017066344 A | 4/2017 |
| JP | 2017066374 A | 4/2017 |
| JP | 2018053003 A | 4/2018 |
| JP | 2018053118 A | 4/2018 |
| JP | 2018162388 A | 10/2018 |
| WO | WO 94/16018 A1 | 7/1994 |
| WO | WO 2015/031232 A1 | 3/2015 |
| WO | WO 2015/064499 A1 | 5/2015 |
| WO | WO 2015/134860 A1 | 9/2015 |
| WO | WO 2017/010364 A1 | 1/2017 |
| WO | WO 2017/057558 A1 | 4/2017 |
| WO | WO 2017/057559 A1 | 4/2017 |

OTHER PUBLICATIONS

Product Information on Dow Corning® MB50-314, Masterbatch, from Dow Corning, 2001, 2 pages.

International Search Report and Written Opinion for PCT/US2016/065514 dated Feb. 15, 2017, 9 pages.

Supplementary European Search Report dated Oct. 29, 2018, 6 pages.

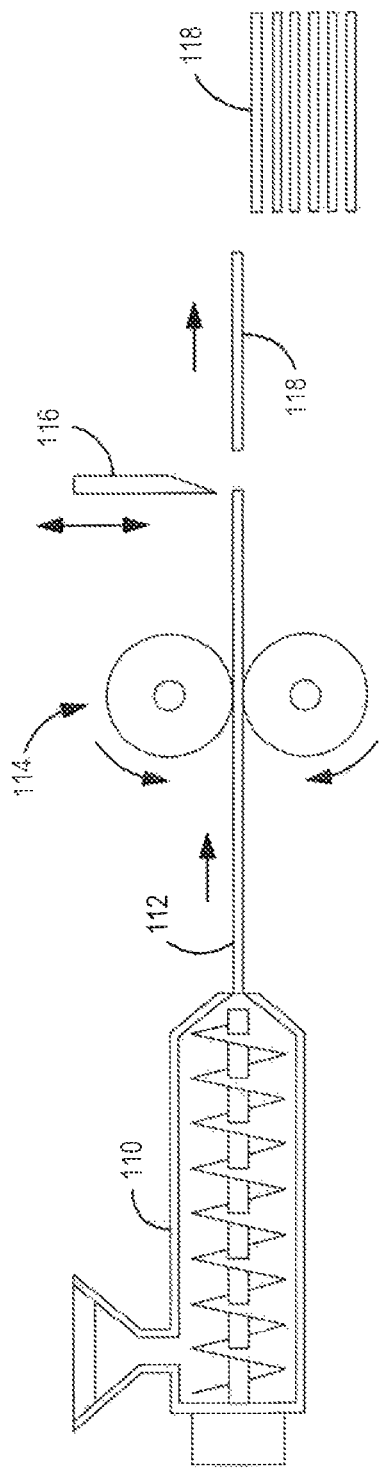
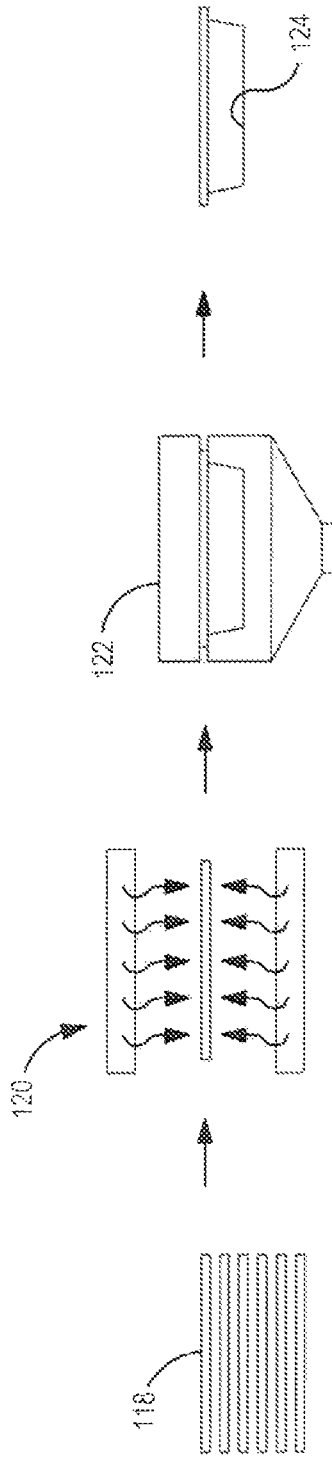
FIG. 1
FIG. 2

CROSSLINKABLE POLYARYLENE SULFIDE COMPOSITION

RELATED APPLICATIONS

The present application claims priority to U.S. Provisional Application Ser. No. 62/266,210, filed on Dec. 11, 2015, which is incorporated herein in its entirety by reference thereto.

BACKGROUND OF THE INVENTION

Polyphenylene sulfide ("PPS") is a high performance thermoplastic resin with outstanding mechanical, thermal, and chemical resistance properties. Unfortunately, PPS tends to be relatively brittle, which can limit its use in applications in which high levels of impact strength are required. To help compensate for its brittle nature, PPS is often blended with impact modifiers, such as elastomers. However, impact modifiers are inherently incompatible with PPS, which can make it difficult to achieve blends with good properties. While compatibilizers have been employed to help improve these features, they generally do not function well in applications that require a high or low temperature. As such, a need currently exists for a PPS composition with improved properties over a wide range of different temperatures.

SUMMARY OF THE INVENTION

In accordance with one embodiment of the present invention, a crosslinkable polymer composition is disclosed that comprises a polyarylene sulfide, from about 0.5 to about 50 parts of an impact modifier per 100 parts of the polyarylene sulfide, and from about 0.1 to about 15 parts of a crosslinking system per 100 parts of the polyarylene sulfide. The impact modifier includes an epoxy-functional polymer and the crosslinking system includes a metal carboxylate.

In accordance with another embodiment of the present invention, a method for forming a polymer product is disclosed that comprises melt blending a polymer composition that comprises a polyarylene sulfide, an impact modifier, and a crosslinking system. The crosslinking system includes a metal carboxylate and the impact modifier includes an epoxy-functional polymer.

Other features and aspects of the present invention are set forth in greater detail below.

BRIEF DESCRIPTION OF THE FIGURES

The present disclosure may be better understood with reference to the following figures:

FIG. 1 is a side view of a process for forming a sheet, which may contain the polymer composition of the present invention;

FIG. 2 is a side view of a thermoforming process that may be employed in one embodiment of the present invention;

DETAILED DESCRIPTION

Figure 3:
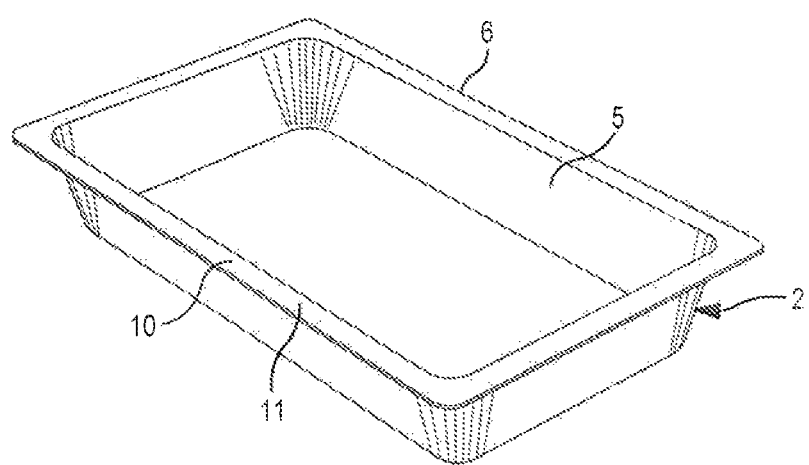
FIG. 3 is a perspective view of one embodiment of a shaped part that may be formed from the polymer composition of the present invention in the form of a food tray.

It is to be understood by one of ordinary skill in the art that the present discussion is a description of exemplary embodiments only, and is not intended as limiting the broader aspects of the present disclosure.

Generally speaking, the present invention is directed to a crosslinked polymer product that is capable of exhibiting excellent strength and flexibility under a variety of different conditions. More particularly, the crosslinked product is formed from a crosslinkable polymer composition that contains a polyarylene sulfide, epoxy-functional polymeric impact modifier, and a crosslinking system that includes a metal carboxylate. Without intending to be limited by theory, it is believed that the metal atom in the carboxylate can act as a Lewis acid that accepts electrons from the oxygen atom located in the epoxy functional group of the impact modifier. Once it reacts with the carboxylate, the epoxy functional group becomes activated and can be readily attacked at either carbon atom in the three-membered ring via nucleophilic substitution. This leads to crosslinking between the chains of the impact modifier. In certain cases, the crosslinking system may also employ an additional crosslinking agent that is "multi-functional" to the extent that it contains at least two reactive, functional groups. Such a multi-functional crosslinking reagent may serve as a weak nucleophile, which can react with activated epoxy functional groups on the impact modifier. The multi-functional nature of such molecules enables them to bridge two epoxy groups, effectively serving as a curing agent.

Through the use of such a unique crosslinking system, the present inventors have discovered that the compatibility and distribution of the polyarylene sulfide and impact modifier can be significantly improved. For example, the impact modifier is capable of being dispersed within the polymer composition in the form of discrete domains of a nano-scale size. For example, the domains may have an average cross-sectional dimension of from about 1 to about 1000 nanometers, in some embodiments from about 5 to about 800 nanometers, in some embodiments from about 10 to about 500 nanometers. The domains may have a variety of different shapes, such as elliptical, spherical, cylindrical, plate-like, tubular, etc. Such improved dispersion can result in either better mechanical properties, or allow for equivalent mechanical properties to be achieved at lower amounts of impact modifier. For example, the crosslinked polymer product can exhibit a notched Charpy impact strength of about 10 kJ/m$^2$ or more, in some embodiments from about 20 to about 150 kJ/m$^2$, and in some embodiments, from about 30 to about 100 kJ/m$^2$, as determined at a temperature of 23° C. in accordance with ISO Test No. 179-1:2010 (technically equivalent to ASTM D256, Method B). Beneficially, the polymer product has a high degree of thermal resistance and thus can exhibit good properties at both high and low temperatures. For example, the polymer product can exhibit a notched Charpy impact strength of about 2 kJ/m$^2$ or more, in some embodiments from about 5 to about 100 kJ/m$^2$, and in some embodiments, from about 8 to about 50 kJ/m$^2$, as determined at a temperature of −30° C. in accordance with ISO Test No. 179-1:2010 (technically equivalent to ASTM D256, Method B).

The crosslinked polymer product may also exhibit very good tensile characteristics. For example, the polymer composition may exhibit a tensile strain at break of about 40% or more, in some embodiments about 50% or more, and in some embodiments, from about 60% to about 100%; tensile modulus of about 3,000 MPa or less, in some embodiments about 2,500 MPa or less, and in some embodiments, from about 100 to about 2,000 MPa; and/or tensile break stress of about 25 MPa or more, in some embodiments about 30 MPa or more, and in some embodiments, from about 35 to about 100 MPa. Such tensile properties may be determined at a temperature of 23° C. in accordance with ISO Test No. 527-1,2:2012 at a test speed of 5 mm/min (technically equivalent to ASTM D638).

Various embodiments of the present invention will now be discussed in more detail.

I. Crosslinkable Polymer Composition

A. Polyarylene Sulfide

Polyarylene sulfides typically constitute from about 40 wt. % to about 95 wt. %, in some embodiments from about 50 wt. % to about 90 wt. %, and in some embodiments, from about 60 wt. % to about 80 wt. % of the polymer composition. The polyarylene sulfide(s) employed in the composition generally have repeating units of the formula:

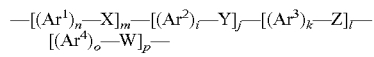

wherein,
$Ar^1$, $Ar^2$, $Ar^3$, and $Ar^4$ are independently arylene units of 6 to 18 carbon atoms; W, X, Y, and Z are independently bivalent linking groups selected from $-SO_2-$, $-S-$, $-SO-$, $-CO-$, $-O-$, $-C(O)O-$ or alkylene or alkylidene groups of 1 to 6 carbon atoms, wherein at least one of the linking groups is $-S-$; and
n, m, i, j, k, l, o, and p are independently 0, 1, 2, 3, or 4, subject to the proviso that their sum total is not less than 2.

The arylene units $Ar^1$, $Ar^2$, $Ar^3$, and $Ar^4$ may be selectively substituted or unsubstituted. Advantageous arylene units are phenylene, biphenylene, naphthylene, anthracene and phenanthrene. The polyarylene sulfide typically includes more than about 30 mol %, more than about 50 mol %, or more than about 70 mol % arylene sulfide ($-S-$) units. For example, the polyarylene sulfide may include at least 85 mol % sulfide linkages attached directly to two aromatic rings. In one particular embodiment, the polyarylene sulfide is a polyphenylene sulfide, defined herein as containing the phenylene sulfide structure $-(C_6H_4-S)_n-$ (wherein n is an integer of 1 or more) as a component thereof.

Synthesis techniques that may be used in making a polyarylene sulfide are generally known in the art. By way of example, a process for producing a polyarylene sulfide can include reacting a material that provides a hydrosulfide ion (e.g., an alkali metal sulfide) with a dihaloaromatic compound in an organic amide solvent. The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone. The halogen atom can be fluorine, chlorine, bromine or iodine, and two halogen atoms in the same dihaloaromatic compound may be the same or different from each other. In one embodiment, o-dichlorobenzene, m-dichlorobenzene, p-dichlorobenzene or a mixture of two or more compounds thereof is used as the dihalo-aromatic compound. As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide(s) may be homopolymers or copolymers. For instance, selective combination of dihaloaromatic compounds can result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer can be formed containing segments having the structure of formula:

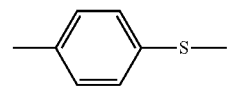

and segments having the structure of formula:

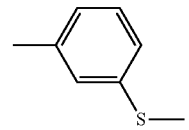

or segments having the structure of formula:

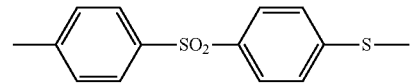

The polyarylene sulfide(s) may be linear, semi-linear, branched or crosslinked. Linear polyarylene sulfides typically contain 80 mol % or more of the repeating unit $-(Ar-S)-$. Such linear polymers may also include a small amount of a branching unit or a crosslinking unit, but the amount of branching or crosslinking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a crosslinking structure or a branched structure introduced into the polymer a small amount of one or more monomers having three or more reactive functional groups. By way of example, monomer components used in forming a semi-linear polyarylene sulfide can include an amount of polyhaloaromatic compounds having two or more halogen substituents per molecule which can be utilized in preparing branched polymers. Such monomers can be represented by the formula R'$X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, etc., and mixtures thereof.

If desired, the polyarylene sulfide can be functionalized. For instance, a disulfide compound containing reactive functional groups (e.g., carboxyl, hydroxyl, amine, etc.) can be reacted with the polyarylene sulfide. Functionalization of the polyarylene sulfide can further provide sites for bonding between the impact modifier and the polyarylene sulfide, which can improve distribution of the impact modifier throughout the polyarylene sulfide and prevent phase separation. The disulfide compound may undergo a chain scission reaction with the polyarylene sulfide during melt processing to lower its overall melt viscosity. When employed, disulfide compounds typically constitute from about 0.01 wt. % to about 3 wt. %, in some embodiments from about 0.02 wt. % to about 1 wt. %, and in some embodiments, from about 0.05 to about 0.5 wt. % of the polymer composition. The ratio of the amount of the polyarylene sulfide to the amount of the disulfide compound may likewise be from about 1000:1 to about 10:1, from about 500:1 to about 20:1, or from about 400:1 to about 30:1. Suitable disulfide compounds are typically those having the following formula:

$R^3$—S—S—$R^4$ wherein $R^3$ and $R^4$ may be the same or different and are hydrocarbon groups that independently include from 1 to about 20 carbons. For instance, $R^3$ and $R^4$ may be an alkyl, cycloalkyl, aryl, or heterocyclic group. In certain embodiments, $R^3$ and $R^4$ are generally nonreactive functionalities, such as phenyl, naphthyl, ethyl, methyl, propyl, etc. Examples of such compounds include diphenyl disulfide, naphthyl disulfide, dimethyl disulfide, diethyl disulfide, and dipropyl disulfide. $R^3$ and $R^4$ may also include reactive functionality at terminal end(s) of the disulfide compound. For example, at least one of $R^3$ and $R^4$ may include a terminal carboxyl group, hydroxyl group, a substituted or non-substituted amino group, a nitro group, or the like. Examples of compounds may include, without limitation, 2,2'-diaminodiphenyl disulfide, 3,3'-diaminodiphenyl disulfide, 4,4'-diaminodiphenyl disulfide, dibenzyl disulfide, dithiosalicyclic acid (or 2,2'-dithiobenzoic acid), dithioglycolic acid, α,α'-dithiodilactic acid, β,β'-dithiodilactic acid, 3,3'-dithiodipyridine, 4,4'dithiomorpholine, 2,2'-dithiobis(benzothiazole), 2,2'-dithiobis(benzimidazole), 2,2'-dithiobis(benzoxazole), 2-(4'-morpholinodithio)benzothiazole, etc., as well as mixtures thereof.

In one embodiment, the polyarylene sulfide may be an untreated polyarylene sulfide. In another embodiment, the polyarylene sulfide may be a treated polyarylene sulfide. For instance, the polyarylene sulfide may be heated in an oxygen atmosphere and/or in the presence of a cross-linking agent, such as a peroxide. By employing a treated polyarylene sulfide polymer, a color change of the polyarylene sulfide polymer composition can be obtained. For instance, the color of the composition can be changed by adjusting the ratio of the untreated polyarylene sulfide to the treated polyarylene sulfide. Color changes may also be achieved by employing cured or branched polyarylene sulfide in lieu of or in addition to the treated polyarylene sulfide.

B. Impact Modifier

Impact modifiers typically constitute from 5 to about 50 parts, in some embodiments from about 10 to about 45 parts, and in some embodiments, from about 20 to about 40 parts per 100 parts of the polyarylene sulfide. For example, the impact modifiers may constitute from about 1 wt. % to about 40 wt. %, in some embodiments from about 5 wt. % to about 35 wt. %, and in some embodiments, from about 15 wt. % to about 30 wt. % of the polymer composition.

As noted above, the impact modifier includes an epoxy-functional polymer. Typically, such polymers are considered "polyepoxides" to the extent that contain at least two oxirane rings per molecule. The polyepoxide may be a linear or branched, homopolymer or copolymer (e.g., random, graft, block, etc.) containing terminal epoxy groups, skeletal oxirane units, and/or pendent epoxy groups. The monomers employed to form such polyepoxides may vary. In one particular embodiment, for example, the impact modifier contains at least one epoxy-functional (meth)acrylic monomeric component. The term "(meth)acrylic" includes acrylic and methacrylic monomers, as well as salts or esters thereof, such as acrylate and methacrylate monomers. Suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

Of course, the copolymer may also contain other monomeric units as is known in the art. For example, another suitable monomer may include a (meth)acrylic monomer that is not epoxy-functional. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. In one particular embodiment, for example, the copolymer may be a terpolymer formed from an epoxy-functional (meth)acrylic monomeric component, α-olefin monomeric component, and non-epoxy functional (meth)acrylic monomeric component. The copolymer may, for instance, be poly(ethylene-co-butylacrylate-co-glycidyl methacrylate), which has the following structure:

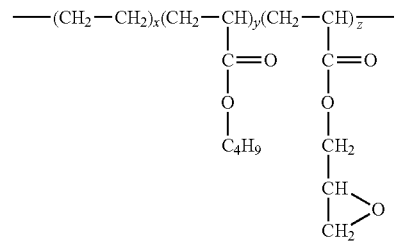

wherein, x, y, and z are 1 or greater.

The relative portion of the monomeric component(s) may be selected to achieve a balance between epoxy-reactivity and melt flow rate. More particularly, high epoxy monomer contents can result in good reactivity with the matrix polymer, but too high of a content may reduce the melt flow rate to such an extent that the copolymer adversely impacts the melt strength of the polymer blend. Thus, in most embodiments, the epoxy-functional (meth)acrylic monomer(s) constitute from about 1 wt. % to about 20 wt. %, in some embodiments from about 2 wt. % to about 15 wt. %, and in some embodiments, from about 3 wt. % to about 10 wt. % of the copolymer. The α-olefin monomer(s) may likewise constitute from about 55 wt. % to about 95 wt. %, in some embodiments from about 60 wt. % to about 90 wt. %, and in some embodiments, from about 65 wt. % to about 85 wt. % of the copolymer. When employed, other monomeric components (e.g., non-epoxy functional (meth)acrylic monomers) may constitute from about 5 wt. % to about 35 wt. %, in some embodiments from about 8 wt. % to about 30 wt. %, and in some embodiments, from about 10 wt. % to about 25 wt. % of the copolymer. The result melt flow rate is typically from about 1 to about 30 grams per 10 minutes ("g/10 min"), in some embodiments from about 2 to about 20 g/10 min, and in some embodiments, from about 3 to about 15 g/10 min, as determined in accordance with ASTM D1238-13 at a load of 2.16 kg and temperature of 190° C.

One example of a suitable epoxy-functionalized copolymer that may be used in the present invention is commercially available from Arkema under the name LOTADER® AX8840. LOTADER® AX8840, for instance, has a melt flow rate of 5 g/10 min and is a random copolymer of ethylene and a glycidyl methacrylate (monomer content of 8 wt. %). Another suitable copolymer is commercially available from DuPont under the name ELVALOY® PTW, which is a terpolymer of ethylene, butyl acrylate, and glycidyl methacrylate and has a melt flow rate of 12 g/10 min and a glycidyl methacrylate monomer content of 4 wt. % to 5 wt. %.

If desired, additional impact modifiers may also be employed in combination with the epoxy-functional impact modifier. For example, the additional impact modifier may include a block copolymer in which at least one phase is made of a material that is hard at room temperature but fluid upon heating and another phase is a softer material that is rubber-like at room temperature. For instance, the block copolymer may have an A-B or A-B-A block copolymer repeating structure, where A represents hard segments and B is a soft segment. Non-limiting examples of impact modifiers having an A-B repeating structure include polyamide/polyether, polysulfone/polydimethylsiloxane, polyurethane/polyester, polyurethane/polyether, polyester/polyether, polycarbonate/polydimethylsiloxane, and polycarbonate/polyether. Triblock copolymers may likewise contain polystyrene as the hard segment and either polybutadiene, polyisoprene, or polyethylene-co-butylene as the soft segment. Similarly, styrene butadiene repeating co-polymers may be employed, as well as polystyrene/polyisoprene repeating polymers. In one particular embodiment, the block copolymer may have alternating blocks of polyamide and polyether. Such materials are commercially available, for example from Atofina under the PEBAX™ trade name. The polyamide blocks may be derived from a copolymer of a diacid component and a diamine component, or may be prepared by homopolymerization of a cyclic lactam. The polyether block may be derived from homo- or copolymers of cyclic ethers such as ethylene oxide, propylene oxide, and tetrahydrofuran.

C. Crosslinking System

The crosslinking system, which may include the metal carboxylate and other optional crosslinking agents, typically constitutes from about 0.1 to about 15 parts, in some embodiments from about 0.2 to about 10 parts, and in some embodiments, from about 0.5 to about 5 parts per 100 parts of the polyarylene sulfide. For example, the crosslinking system my constitute from about 0.05 wt. % to about 15 wt. %, in some embodiments from about 0.1 wt. % to about 10 wt. %, and in some embodiments, from about 0.2 wt. % to about 5 wt. % of the polymer composition.

i. Metal Carboxylate

As noted above, the crosslinking system includes a metal carboxylate. Without intending to be limited by theory, it is believed that the metal atom in the carboxylate can act as a Lewis acid that accepts electrons from the oxygen atom located in the epoxy functional group of the impact modifier. Once it reacts with the carboxylate, the epoxy functional group becomes activated and can be readily attacked at either carbon atom in the three-membered ring via nucleophilic substitution, thereby resulting in crosslinking between the chains of the impact modifier.

The metal carboxylate is typically a metal salt of a fatty acid. The metal cation employed in the salt may vary, but is typically a divalent metal, such as calcium, magnesium, lead, barium, strontium, zinc, iron, cadmium, nickel, copper, tin, etc., as well as mixtures thereof. Zinc is particularly suitable. The fatty acid may generally be any saturated or unsaturated acid having a carbon chain length of from about 8 to 22 carbon atoms, and in some embodiments, from about 10 to about 18 carbon atoms. If desired, the acid may be substituted. Suitable fatty acids may include, for instance, lauric acid, myristic acid, behenic acid, oleic acid, palmitic acid, stearic acid, ricinoleic acid, capric acid, neodecanoic acid, hydrogenated tallow fatty acid, hydroxy stearic acid, the fatty acids of hydrogenated castor oil, erucic acid, coconut oil fatty acid, etc., as well as mixtures thereof. Metal carboxylates typically constitute from about 0.05 wt. % to about 5 wt. %, in some embodiments from about 0.1 wt. % to about 2 wt. %, and in some embodiments, from about 0.2 wt. % to about 1 wt. % of the polymer composition.

ii. Multi-Functional Crosslinking Agent

Although not necessarily required, the crosslinking system may also employ a crosslinking agent that is "multi-functional" to the extent that it contains at least two reactive, functional groups. Such a multi-functional crosslinking reagent may serve as a weak nucleophile, which can react with activated epoxy functional groups on the impact modifier. When employed, such multi-functional crosslinking agents typically constitute from about 50 wt. % to about 95 wt. %, in some embodiments from about 60 wt. % to about 90 wt. %, and in some embodiments, from about 70 wt. % to about 85 wt. % of the crosslinking system, while the metal carboxylates typically constitute from about 5 wt. % to about 50 wt. %, in some embodiments from about 10 wt. % to about 40 wt. %, and in some embodiments, from about 15 wt. % to about 30 wt. % of the crosslinking system. For example, the multi-functional crosslinking agents may constitute from about 0.1 wt. % to about 10 wt. %, in some embodiments from about 0.2 wt. % to about 5 wt. %, and in some embodiments, from about 0.5 wt. % to about 3 wt. % of the polymer composition. Of course, in certain embodiments, the composition may be generally free of such multi-functional crosslinking agents so that the crosslinking system is formed entirely from the metal carboxylates.

The multi-functional crosslinking agents generally include two or more reactively functional terminal moieties linked by a bond or a non-polymeric (non-repeating) linking component. By way of example, the crosslinking agent can include a di-epoxide, poly-functional epoxide, diisocyanate, polyisocyanate, polyhydric alcohol, water-soluble carbodiimide, diamine, diol, diaminoalkane, multi-functional carboxylic acid, diacid halide, etc. Multi-functional carboxylic acids and amines are particularly suitable. Specific examples of multi-functional carboxylic acid crosslinking agents can include, without limitation, isophthalic acid, terephthalic acid, phthalic acid, 1,2-di(p-carboxyphenyl)ethane, 4,4'-dicarboxydiphenyl ether, 4,4'-bisbenzoic acid, 1,4- or 1,5-naphthalene dicarboxylic acids, decahydronaphthalene dicarboxylic acids, norbornene dicarboxylic acids, bicyclooctane dicarboxylic acids, 1,4-cyclohexanedicarboxylic acid (both cis and trans), 1,4-hexylenedicarboxylic acid, adipic acid, azelaic acid, dicarboxyl dodecanoic acid, succinic acid, maleic acid, glutaric acid, suberic acid, azelaic acid and sebacic acid. The corresponding dicarboxylic acid derivatives, such as carboxylic acid diesters having from 1 to 4 carbon atoms in the alcohol radical, carboxylic acid anhydrides or carboxylic acid halides may also be utilized. In certain embodiments, aromatic dicarboxylic acids are particularly suitable, such as isophthalic acid or terephthalic acid.

D. Other Components

The composition can also include one or more additives as are generally known in the art, such as fillers (e.g., particulate fillers, fibers, etc.), colorants (e.g., inorganic pigments), flame retardants, nucleating agents, coupling agents, stabilizers (e.g., UV stabilizers, UV absorbers, heat stabilizers, etc.), lubricants, antioxidants, flow promoters, etc. to enhance properties and/or processability. In one embodiment, for example, the polymer composition may contain a heat stabilizer. By way of example, the heat stabilizer can be a phosphite stabilizer, such as an organic phosphite. For example, suitable phosphite stabilizers include monophosphites and diphosphites, wherein the diphosphite has a molecular configuration that inhibits the absorption of moisture and/or has a relatively high Spiro isomer content. For instance, a diphosphite stabilizer may be selected that has a spiro isomer content of greater than 90%, such as greater than 95%, such as greater than 98%. Specific examples of such diphosphite stabilizers include, for instance, bis(2,4-dicumylphenyl)pentaerythritol diphosphite, bis(2,4-di-t-butylphenyl)pentaerythritol diphosphite, distearyl pentaerythritol diphosphite, mixtures thereof, etc. When employed, heat stabilizers typically constitute from about 0.1 wt. % to about 3 wt. %, and in some embodiments, from about 0.2 wt. % to about 2 wt. % of the composition.

In other embodiments, an inorganic filler (e.g., fibrous filler, particulate filler, etc.) may also be employed, such as in an amount of from about 0.5 wt. % to about 50 wt. %, in some embodiments from about 1 wt. % to about 45 wt. %, and in some embodiments, from about 5 wt. % to about 40 wt. % of the composition. Suitable fibrous fillers may include, for instance, glass fibers. Fiber diameters can vary depending upon the fibers used and are available in either chopped or continuous form. The fibers, for instance, can have a diameter of less than about 100 µm, such as less than about 50 µm. Inorganic particulate fillers may also be employed, either alone or in combination with fibrous fillers. Examples of particulate fillers may include, for instance, boron-containing compounds (e.g., boron nitride, sodium tetraborate, potassium tetraborate, calcium tetraborate, etc.), alkaline earth metal carbonates (e.g., calcium magnesium carbonate), oxides (e.g., titanium oxide, aluminum oxide, magnesium oxide, zinc oxide, antimony trioxide, etc.), silicates (e.g., talc, sodium-aluminum silicate, calcium silicate, magnesium silicate, etc.), salts of alkaline earth metals (e.g., calcium carbonate, calcium sulfate, etc.), and so forth.

Clay minerals may be particularly suitable. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite ($(K, H_3O)(Al,Mg,Fe)_2(Si,Al)_4O_{10}[(OH)_2,(H_2O)]$), montmorillonite ($(Na,Ca)_{0.33}(Al,Mg)_2Si_4O_{10}(OH)_2 \cdot nH_2O$), vermiculite ($(MgFe,Al)_3(Al,Si)_4O_{10}(OH)_2 \cdot 4H_2O$), palygorskite ($(Mg,Al)_2Si_4O_{10}(OH) \cdot 4(H_2O)$), pyrophyllite ($Al_2Si_4O_{10}(OH)_2$), etc., as well as combinations thereof. In lieu of, or in addition to, clay minerals, still other mineral fillers may also be employed. For example, other suitable silicate fillers may also be employed, such as calcium silicate, aluminum silicate, mica, diatomaceous earth, wollastonite, and so forth. Mica, for instance, may be a particularly suitable mineral for use in the present invention. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K,Na)(Al,Mg,Fe)_2(Si,Al)_4O_{10}(OH)_2$), etc., as well as combinations thereof.

II. Crosslinking Reaction

A variety of different techniques may be employed in the present invention to react the polyarylene sulfide and impact modifier in the presence of the crosslinking system. In one embodiment, for example, the crosslinked polymer product is formed by melt processing the polyarylene sulfide, impact modifier, and crosslinking system at a temperature sufficient to induce the desired reaction. For example, melt processing may occur at a temperature of from about 50° C. to about 500° C., in some embodiments from about 100° C. to about 400° C., and in some embodiments, from about 150° C. to about 350° C.

The materials may be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. One particularly suitable melt processing device is a co-rotating, twin-screw extruder (e.g., Leistritz co-rotating fully intermeshing twin screw extruder). Such extruders may include feeding and venting ports and provide high intensity distributive and dispersive mixing. For example, the components may be fed to the same or different feeding ports of a twin-screw extruder and melt blended to form a substantially homogeneous melted mixture. Melt blending may occur under high shear/pressure to ensure sufficient dispersion. For example, the apparent shear rate during melt processing may range from about 100 seconds$^{-1}$ to about 10,000 seconds$^{-1}$, and in some embodiments, from about 500 seconds$^{-1}$ to about 1,500 seconds$^{-1}$. Of course, other variables, such as the residence time during melt processing, which is inversely proportional to throughput rate, may also be controlled to achieve the desired degree of homogeneity.

If desired, one or more distributive and/or dispersive mixing elements may be employed within the mixing section of the melt processing unit. Suitable distributive mixers may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further increased in aggressiveness by using pins in the barrel that create a folding and reorientation of the polymer melt, such as those used in Buss Kneader extruders, Cavity Transfer mixers, and Vortex Intermeshing Pin mixers. The speed of the screw can also be controlled to improve the characteristics of the composition. For instance the screw speed can be about 400 rpm or less, in one embodiment, such as between about 200 rpm and about 350 rpm, or between about 225 rpm and about 325 rpm. In one embodiment, the compounding conditions can be balanced so as to provide a polymer composition that exhibits improved impact and tensile properties. For example, the compounding conditions can include a screw design to provide mild, medium, or aggressive screw conditions. For example, system can have a mildly aggressive screw design in which the screw has one single melting section on the downstream half of the screw aimed towards gentle melting and distributive melt homogenization. A medium aggressive screw design can have a stronger melting section upstream from the filler feed barrel focused more on stronger dispersive elements to achieve uniform melting. Additionally it can have another gentle mixing section downstream to mix the fillers. This section, although weaker, can still add to the shear intensity of the screw to make it stronger overall than the mildly aggressive design. A highly aggressive screw design can have the strongest shear intensity of the three. The main melting section can be composed of a long array of highly dispersive kneading blocks. The downstream mixing section can utilize a mix of distributive and intensive dispersive elements to achieve uniform dispersion of all type of fillers. The shear intensity of the highly aggressive screw design can be significantly higher than the other two designs. In one embodiment, a system can include a medium to aggressive screw design with relatively mild screw speeds (e.g., between about 200 rpm and about 300 rpm).

Figure 4:
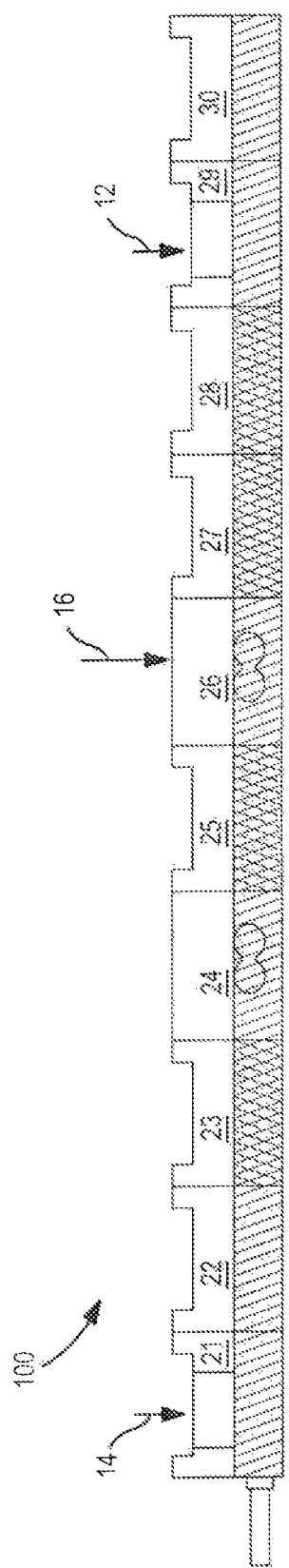
FIG. 4 is a schematic representation of a process for forming a polymer composition as disclosed herein.

FIG. 4 schematically illustrates a process that can be used in forming the polymer composition. As illustrated, the components of the composition may be melt-kneaded in a melt processing unit, such as an extruder 100. In the illustrated embodiment, the extruder 100 includes ten (10) barrels numbered 21-30 along the length of the extruder 100, as shown. Each barrel 21-30 can include feed lines 14, 16, vents 12, temperature controls, etc. that can be independently operated. A general purpose screw design can be used to melt process the polymer composition. By way of example, a composition may be melt mixed using a twin screw extruder, such as a Coperion co-rotating fully intermeshing twin screw extruder. If desired, the polyarylene sulfide may be fed to the extruder 100 at a main feed throat 14. In this manner, the polyarylene sulfide can be melted and mixed with the other components of the composition as it progresses through the extruder 100. The impact modifier, metal carboxylate, and optional multi-functional crosslinking agent can also be added at the main feed throat 14 or downstream of the main feed throat, if desired. In certain embodiments, for instance, the impact modifier and metal carboxylate are added at the main feed throat 14 and the multi-functional crosslinking agent is added after mixing of other components. For instance, in the illustrated embodiment, a second feed line 16 at barrel 26 can be used for the addition of the crosslinking agent. Following the addition of all components to the mixer, the polymer composition is thoroughly mixed in the remaining section(s) of the extruder and extruded through a die. The final extrudate can be pelletized or otherwise shaped as desired.

Regardless of the manner in which they are combined together, the present inventors have discovered that the polymer composition may possess a relatively low melt viscosity, which allows it to readily flow into a mold cavity during production of the part. For instance, the composition may have a melt viscosity of about 1,500 Pa-s or less, in some embodiments about 1,000 Pa-s or less, and in some embodiments, from about 100 to about 800 poise, as determined by a capillary rheometer at a temperature of about 310° C. and shear rate of 1,200 seconds$^{-1}$. Nevertheless, when crosslinked, the resulting polymer product will generally have a high complex viscosity, such as about 1,000 Pa-s or more, in some embodiments about 1,500 Pa-s or more, and in some embodiments, from about 2,000 to about 10,000 Pa-s, as determined by a parallel plate rheometer at an angular frequency of 0.1 radians per second, temperature of 310° C., and constant strain amplitude of 3%.

Additionally, the color of a polyarylene sulfide composition (and shaped parts formed therefrom) may be changed without altering the concentration of any colorants or other additives. For instance, this may be achieved by employing a treated polyarylene sulfide in combination with an untreated polyarylene sulfide. The color measurements can be quantified by measuring the absorbance with an optical reader in accordance with a standard test methodology known as "CIELAB", which is described in Pocket Guide to Digital Printing by F. Cost, Delmar Publishers, Albany, N.Y. ISBN 0-8273-7592-1 at pages 144 and 145 and "Photoelectric color difference meter", Journal of Optical Society of America, volume 48, page numbers 985-995, S. Hunter, (1958), both of which are incorporated herein by reference in their entirety. More specifically, the CIELAB test method defines three "Hunter" scale values, L*, a*, and b*, which correspond to three characteristics of a perceived color based on the opponent theory of color perception and are defined as follows: L=Lightness (or luminosity), ranging from 0 to 100, where 0=dark and 100=light; a*=Red/green axis, ranging from −100 to 100; positive values are reddish and negative values are greenish; and b*=Yellow/blue axis, ranging from −100 to 100; positive values are yellowish and negative values are bluish. The chromaticity can then be determined to provide an indication of the quality of the color.

III. Shaped Parts

The polymer composition may be employed in a wide variety of different types of shaped parts using various techniques, such as extrusion, injection molding, blow-molding, thermoforming, foaming, compression molding, hot-stamping, fiber spinning, pultrusion and so forth. In certain embodiments, for instance, a shaped part may be formed by a molding technique, such as injection molding, compression molding, nanomolding, overmolding, blow molding, etc. For example, as is known in the art, injection molding can occur in two main phases—i.e., an injection phase and holding phase. During the injection phase, the mold cavity is completely filled with the molten polymer composition. The holding phase is initiated after completion of the injection phase in which the holding pressure is controlled to pack additional material into the cavity and compensate for volumetric shrinkage that occurs during cooling. After the shot has built, it can then be cooled. Once cooling is complete, the molding cycle is completed when the mold opens and the part is ejected, such as with the assistance of ejector pins within the mold.

Various devices may employ a molded part that contains the polymer composition of the present invention. For example, the polymer composition may be used in components such as bearings, electrical sensors, coils (e.g., pencil, ignition, etc.), clamps (e.g., hose clamps), valves, switches, printer parts, pumps (e.g., gear pumps, pump impellers, pump housings, etc.), dashboards, pipes, hoses (e.g., for vehicular exhaust systems), tubes, oil and gas flowlines (e.g., downhole centralizer). For example, in one embodiment, an elongated member may be formed that has a hollow interior to allow the passage of a fluid (e.g., oil, fuel, water, exhaust gases, etc.). The elongated member may have a variety of shapes, such as tubular or other complex shapes. The elongated member may extend in a single direction or in multiple directions so that it includes multiple angular displacements. In another embodiment, the elongated member may be a downhole centralizer, which contains bowed elements that are fitted with a hinged collar. As is known in the art, such centralizers are generally used to keep a casing or liner in the center of a wellbore to ensure efficient placement of a sheath (e.g., cement) around the casing string.

In yet another embodiment, the shaped part may be used to form an overmolded structure. This may be accomplished by "overmolding" the polymer composition onto a portion or the entire surface of the metal component so that it forms a resinous component that is adhered thereto. The metal component may contain any of a variety of different metals, such as aluminum, stainless steel, magnesium, nickel, chromium, copper, titanium, and alloys thereof. Magnesium-aluminum alloys are particularly suitable for use in the metal component. Such alloys typically contain from 0.5 wt. % to 15 wt. % aluminum and 85 wt. % to 99.5 wt. % magnesium. The metal component may be shaped using known techniques, such as casting, forging, etc., and may possess any desired shape or size depending on the intended use of the composite structure. The polymer composition generally adheres to the metal component during overmolding by flowing within and/or around surface indentations or pores of the metal component. To improve adhesion, the metal component may optionally be pretreated to increase the degree of surface indentations and surface area. This may be accomplished using mechanical techniques (e.g., sandblasting, grinding, flaring, punching, molding, etc.) and/or chemical techniques (e.g., etching, anodic oxidation, etc.). For instance, techniques for anodically oxidizing a metal surface are described in more detail in U.S. Pat. No. 7,989,079 to Lee, et al. In addition to pretreating the surface, the metal component may also be preheated at a temperature close to, but below the melt temperature of the polymer composition. This may be accomplished using a variety of techniques, such as contact heating, radiant gas heating, infrared heating, convection or forced convection air heating, induction heating, microwave heating or combinations thereof. In any event, the polymer composition is generally injected into a mold that contains the optionally preheated metal component. Once formed into the desired shape, the composite structure is allowed to cool so that the resinous component becomes firmly adhered to the metal component.

Of course, other techniques for forming shaped parts may be employed. In one embodiment, for instance, the polymer composition may be melt extruded into a sheet that can be used to form a film, fiber, thermoformed article, etc. Suitable melt extrusion techniques may include, for instance, tubular trapped bubble film processes, flat or tube cast film processes, slit die flat cast film processes, etc. Referring to FIG. 1, for instance, one embodiment of a melt extrusion process is shown in more detail. As illustrated, the components of the polymer composition may be initially fed to an extruder 110 that heats the composition to a temperature sufficient for it to flow. In one embodiment, the polymer composition is heated to a temperature that is at the melting temperature of the polymer composition or within a range of about 20° C. above or below the melting temperature of the polymer composition. The extruder 110 produces a precursor sheet 112. Before having a chance to solidify, the precursor sheet 112 may optionally be fed into a nip of a calendering device 114 to form a polymeric sheet have a more uniform thickness. The calendering device 114 may include, for instance, a pair of calendering rolls that form the nip. Once calendered, the resulting polymeric sheet may optionally be cut into individual sheets 118 using a cutting device 116.

The resulting melt-extruded sheet may, in certain embodiments, be used in a thermoforming process by heating it to a certain temperature so that it becomes flowable, shaping the sheet within a mold, and then optionally trimming the shaped article to create the desired article. For example, a sheet may be clamped inside a thermoformer and heated (e.g., with infrared heaters) to a temperature at or near the melting temperature of the polymer matrix, such as to a temperature of about 250° C. or more, in some embodiments about 270° C. or more, and in some embodiments, from about 280° C. to about 350° C. Depending on the type of machine used, the sheet may be transferred to a forming station or the bottom heating elements may be moved for the forming tool to be able to form the sheet. If desired, the sheet may also be dried before thermoforming to help remove moisture from the composition. For instance, drying may occur at a temperature of from about 60° C. to about 200° C., and in some embodiments, from about 100° C. to about 160° C. Different thermoforming techniques can be successfully used, such as vacuum forming, plug-assist vacuum forming, pressure forming, reverse draw, twin sheet thermoforming and others. Once the forming step is completed, the part can be trimmed.

Referring to FIG. 2, for example, one particular embodiment of a thermoforming process is shown in more detail. As illustrated, the polymeric sheet 118 is first fed to a heating device 120 that heats it to a temperature sufficient to cause the polymer to deform or stretch. In general, any suitable heating device may be used, such as a convection oven, electrical resistance heater, infrared heater, etc. Once heated, the polymeric sheet 118 is fed to a molding device 122 where it is molded into an article. Any of a variety of molding devices may be employed in the thermoforming process, such as a vacuum mold (e.g., porous mold). Regardless, a force (e.g., suction force) is typically placed against the sheet to cause it to conform to the contours of the mold. At the contours, for instance, the draw ratio may be greater than 1:1 to about 5:1. Molding of the polymeric sheet 118 typically occurs before the sheet substantially solidifies and/or crystallizes. Thus, the properties of the polymer are not only important during production of the polymeric sheets 118, but are also important during the subsequent molding process. If the polymeric sheet 118 were to solidify and/or crystallize too quickly, the polymer may tear, rupture, blister or otherwise form defects in the final article during molding.

Regardless of the process employed, the melt-extruded composition may be shaped into a variety sizes, and it may be used in a wide range of different applications. For example, due to its unique combination of thermal stability, chemical resistance, and good mechanical properties, the melt-extruded composition may be useful as a replacement for metals or coated metals used as a thermal or chemical shield. Examples of such applications include, for instance, heat exchangers (e.g., flue gas heat exchangers), automotive parts, appliances (e.g., ovens or microwaves), construction equipment, railways, package, container, tray (e.g., for a food article or in electronic applications), reactors, hydrogen generators, electronic parts (e.g., housings, connectors, circuit boards etc.), cookware, bakeware, etc. Typical uses of the article in such applications include, for instance, as a housing, shield, frame, cover, etc.

Referring to FIG. 3, in one embodiment, for instance, a food tray 2 may be formed in part or entirely from the melt-extruded polymer composition of the present invention. In the illustrated embodiment, for instance, the food tray 2 is generally rectangular in shape and contains a sidewall 6 that extends upwardly from a lower wall of the tray 2 to define a receptacle 5 for one or more food products. The sidewall and/or bottom wall may be formed from the polymer composition of the present invention. A flange 10, which can be formed from the polymer composition of the present invention, also protrudes from the sidewall 6 and extends around the perimeter of the tray 2. If desired, a lid (not shown) may cover the tray 2 so that it is positioned adjacent to an upper surface 11 of the flange 10. If desired, the lid may also be formed from the polymer composition of the present invention.

Test Methods

Notched Charpy Impact Strength:

Notched Charpy properties may be determined in accordance with ISO Test No. 179-1:2010 (technically equivalent to ASTM D256, Method B). This test may be run using a Type A notch (0.25 mm base radius) and Type 1 specimen size (length of 80 mm, width of 10 mm, and thickness of 4 mm). Specimens are cut from the center of a multi-purpose bar using a single tooth milling machine. The testing temperature may be 23° C. or −30° C.

Tensile Properties:

Tensile modulus, strength at break, elongation at break, etc. may be determined in accordance with ISO Test No. 527-1,2:2012 (technically equivalent to ASTM D638). Measurements are made on a test strip sample having a length of 80 mm, thickness of 10 mm, and width of 4 mm. The testing temperature is 23° C. and the testing speed is 5 mm/min.

Melt Viscosity:

Melt viscosity (Pa-s) may be determined in accordance with ISO Test No. 11443:2005 at 310° C. and at a shear rate of 1,200 $s^{-1}$ using a Dynisco 7001 capillary rheometer. The rheometer orifice (die) had a diameter of 1 mm, length of 20 mm, L/D ratio of 20.1, and an entrance angle of 180°. The diameter of the barrel was 9.55 mm+0.005 mm and the length of the rod was 233.4 mm.

Complex Viscosity:

The complex viscosity is used herein as an estimate for the "low shear" viscosity of the polymer composition at low frequencies. Complex viscosity is a frequency-dependent viscosity, determined during forced harmonic oscillation of shear stress at angular frequencies of 0.1 and 500 radians per second. Measurements may be determined at a constant temperature of 310° C. and at constant strain amplitude of 3% using an ARES-G2 rheometer (TA Instruments) with a parallel plate configuration (25 mm plate diameter). The gap distance may be kept at 1.5 mm for pellet samples. A dynamic strain sweep may be performed on sample prior to the frequency sweep to find LVE regime and optimized testing conditions. The strain sweep may be done from 0.1% to 100% at a frequency 6.28 rad/s.

Color Measurements:

Color measurements were performed using a DataColor 650 Spectrophotometer utilizing an integrating sphere with measurements made using the specular included mode. Color coordinates can likewise be calculated according to ASTM D2244-11 under an illuminant D65/10°, A/10°, or F2/10° observer, using CIELAB units (L*, a*, b*). Also reported is the C* value (chromaticity) calculated by the following equation: $C^* = (a^{*2} + B^{*2})^{1/2}$ wherein, a* is the red/green axis value of the color of the specimen and b* is the yellow/blue axis value of the color of the specimen.

Materials Employed

The following materials are employed in the Examples:

PPS 1: Fortron® 0214 linear polyphenylene sulfide (Ticona);

PPS 2: Fortron® 0205 linear polyphenylene sulfide (Ticona);

PPS 3: Ryton® PR25 treated polyphenylene sulfide available from Solvay;

Impact Modifier 1: LOTADER® AX8840—a random copolymer of ethylene and glycidyl methacrylate available from Arkema;

Impact Modifier 2: ELVALOY® PTW—a terpolymer of ethylene, butyl acrylate, and glycidyl methacrylate available from DuPont;

Crosslinking Agent 1: Terephthalic Acid;

Crosslinking Agent 2: Struktol® Zinc Stearate from Struktol;

Crosslinking Agent 3: Aluminum Monostearate;

Crosslinking Agent 4: Zinc Neodecanoate from Sigma;

Glass Fiber: 10-micron glass fiber from Owens Corning;

Lubricant: Glycolube® P available from Lonza;

Heat stabilizer: Doverphos® s-9228 from Dover Chemical; and

Colorants: Inorganic pigments.

Example 1

Various samples are melt mixed using a 32 mm Coperion co-rotating, fully-intermeshing, twin-screw extruder with ten temperature control zones including one at the die. The polyarylene sulfide, impact modifiers, heat stabilizer, Crosslinking Agent 2, and lubricants are fed to the main feed throat in the first barrel by means of a gravimetric feeder. Upon melting and mixing of the above ingredients, Crosslinking Agent 1 is fed using a gravimetric feeder at barrel 6. Materials are further mixed then extruded through a strand die. The strands are water-quenched in a bath to solidify and granulated in a pelletizer. The resulting compositions are set forth in more detail in the table below.

|  | Sample 1 | Sample 2 | Sample 3 | Sample 4 | Sample 5 |
|---|---|---|---|---|---|
| PPS Flake | 73.45 | 73.15 | 72.95 | 72.65 | 72.90 |
| Impact Modifier 1 | 25 | 25 | 25 | 25 | 25 |
| Crosslinking Agent 1 | 1.25 | 1.25 | 1.25 | 1.25 | 1 |
| Crosslinking Agent 2 | 0 | 0.3 | 0.5 | 0.8 | 0.5 |
| Lubricant | 0.3 | 0.3 | 0.3 | 0.3 | 0.3 |
| Heat Stabilizer | 0 | 0 | 0 | 0 | 0.3 |

Following formation, the samples are tested for a variety of physical characteristics. The results are set forth below.

|  | Sample 1 | Sample 2 | Sample 3 | Sample 4 | Sample 5 |
|---|---|---|---|---|---|
| Melt Viscosity (Pa · s) at 1200 $s^{-1}$ | 388 | 445 | 500 | 560 | 582 |

-continued

|  | Sample 1 | Sample 2 | Sample 3 | Sample 4 | Sample 5 |
|---|---|---|---|---|---|
| Melt Viscosity ($10^5$ Pa·s) at 0.1 rad/s | 1.8 | NA | 2.4 | 2.75 | NA |
| Tensile Modulus (MPa) | 1,590 | 1,580 | 1,550 | 1,540 | 1,500 |
| Tensile Break Stress (MPa) | 41 | 41 | 41 | 41 | 41 |
| Tensile Break Strain (%) | 63 | 70 | 88 | 80 | 78 |
| Charpy Notched Impact Strength (kJ/m$^2$) at 23° C. | 39 | 41 | 44 | 45 | 49 |
| Charpy Notched Impact Strength (kJ/m$^2$) at −30° C. | 10 | 13 | 16 | 15 | 18 |

As indicated, the use of zinc stearate (Crosslinking Agent 2) in Sample 2 increased the melt viscosity by about 15% in comparison to Sample 1. Furthermore, by increasing the amount of zinc stearate in Samples 3 and 4, both high shear and low shear melt viscosity increased in a linear relationship. The impact strength at 23° C. and −30° C. likewise increased. Samples 1 and 5 were also tested to evaluate drool build-up. More particularly, an extruder is employed that contains an energy transfer screw with 20/60/20 Mesh Screen Pack, 20 mm Die/8 mm mandrel and a 20 mm calibration sleeve. The extrusion conditions are summarized in the table below.

|  | RPM | Die Temp (° C.) | Melt Temp (° C.) | Vacuum (Hg) | Wall Thickness (mm) |
|---|---|---|---|---|---|
| Sample 1 | 30 | 310 | 310 | 5 | 3 |
| Sample 5 | 30 | 310 | 312 | 5 | 3 |

It was observed that Sample 5 is also more tolerant to process change in extrusion as the die drool build-up is significantly less than Sample 1.

Example 2

Various samples are melt mixed using a 32 mm Coperion co-rotating, fully-intermeshing, twin-screw extruder with ten temperature control zones including one at the die. The polyarylene sulfide, impact modifiers, heat stabilizer, Crosslinking Agent 2, 3, or 4, and lubricants are fed to the main feed throat in the first barrel by means of a gravimetric feeder. Upon melting and mixing of the above ingredients, Crosslinking Agent 1 is fed using a gravimetric feeder at barrel 6. Materials are further mixed then extruded through a strand die. The strands are water-quenched in a bath to solidify and granulated in a pelletizer. The resulting compositions are set forth in more detail in the table below.

|  | Sample | | | | | | | | |
|---|---|---|---|---|---|---|---|---|---|
|  | 6 | 7 | 8 | 9 | 10 | 11 | 12 | 13 | 14 |
| PPS 1 | 84.70 | 83.70 | 84.40 | 84.40 | 84.40 | 74.20 | 71.70 | — | — |
| PPS 2 | — | — | — | — | — | — | — | 57.5 | 57.4 |
| Impact Modifier 1 | 15.00 | 15.00 | 15.00 | 15.00 | 15.00 | 25.00 | 25.00 | 10.00 | 10.00 |
| Crosslinking agent 1 | — | 1.00 | 0.2 | 0.2 | 0.2 | 0.40 | 0.40 | — | — |
| Crosslinking agent 2 | — | — | 0.10 | — | — | 0.10 | 0.10 | — | 0.10 |
| Crosslinking agent 3 | — | — | — | 0.10 | — | — | — | — | — |
| Crosslinking agent 4 | — | — | — | — | 0.10 | — | — | — | — |
| Glass Fiber | — | — | — | — | — | — | — | 30 | 30 |
| Heat stabilizer | — | — | 0.30 | 0.30 | 0.30 | 0.30 | 0.30 | — | — |
| Lubricant | 0.30 | 0.30 | — | — | — | — | — | — | — |
| Black color | — | — | — | — | — | — | 2.50 | 2.50 | 2.50 |

Following formation, the samples are tested for a variety of physical characteristics. The results are set forth below.

|  | Sample | | | | | | | | |
|---|---|---|---|---|---|---|---|---|---|
|  | 6 | 7 | 8 | 9 | 10 | 11 | 12 | 13 | 14 |
| Tensile Modulus (MPa) | 2300 | 2200 | 2108 | 1988 | 2253 | 1650 | 1685 | 9216 | 9435 |
| Tensile Stress at Break (MPa) | 50 | 50 | 47 | 36 | 49 | 42 | 44 | 135 | 133 |
| Tensile Strain at Break (%) | 25 | 40 | 39 | 11 | 32 | 90 | 86 | 1.95 | 2.10 |
| Flexural Modulus (MPa) | 2400 | 2200 | 2253 | — | — | 1700 | 1697 | — | — |
| Flexural Stress at 3.5% (MPa) | — | 68 | 67 | — | — | 50 | 49 | — | — |
| Charpy Notched Strength at 23° C. (kJ/m$^2$) | 30 | 40 | 55 | 46 | 60 | 65 | 63 | 10.40 | 12.40 |
| Charpy Notched Strength at −30 C. (kJ/m$^2$) | 9.0 | 10 | 28 | 16 | 39 | 48 | 46 | 8.40 | 9.40 |
| Retention of tensile strength after 2000 hr at 165° C. (%) | 103 | — | 125 | — | — | — | — | — | — |

-continued

| | Sample | | | | | | | | |
|---|---|---|---|---|---|---|---|---|---|
| | 6 | 7 | 8 | 9 | 10 | 11 | 12 | 13 | 14 |
| Retention of elongation after 2000 hr at 165° C. (%) | 13 | — | 50 | — | — | — | — | — | — |
| Volume change after 18 day Norsok Oil Exposure at 150° C. (%) | 17 | 14 | 15 | — | — | 26 | — | — | — |
| Retention of tensile strength after 18 day Norsok Oil exposure at 150° C. (%) | 80 | 76 | 80 | — | — | 65 | — | — | — |

As indicated, using a combination of terephthalic acid and zinc stearate (Sample 8, Crosslinking Agents 1 and 2) increased the flexibility and impact resistance of material. An accelerated heat aging test is also performed on Samples 6 and 8 at 165° C. for 2000 hours. While both samples maintained tensile strength, the retention of elongation at break for Sample 8 is 3 times better than that of Sample 6. A swelling test was also performed for Samples 1, 6, 7, 8 and 11. As noted, higher impact modifier content resulted in a higher volume change and tensile strength change after exposure.

Figures 5, 6, 7:
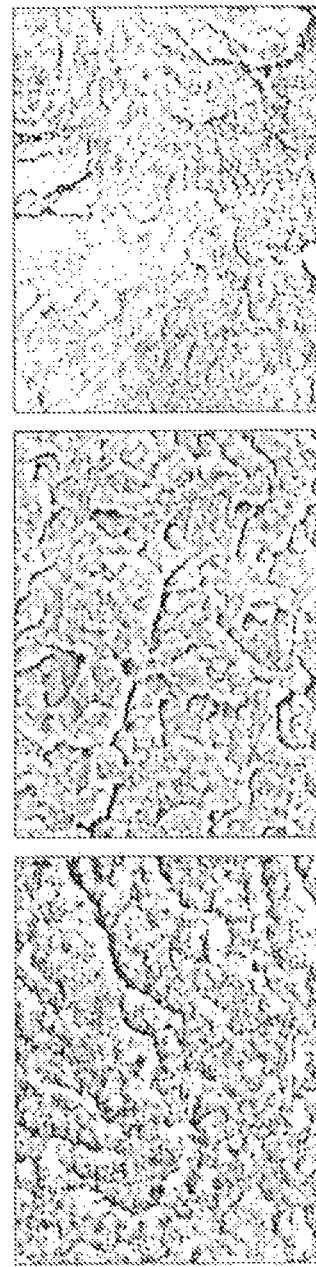
FIG. 5 is an SEM image of Sample 6 of Example 2.
FIG. 6 is an SEM image of Sample 8 of Example 2.
FIG. 7 is an SEM image of Sample 11 of Example 2.

SEM images were also taken of Samples 6, 8, and 11. The results are shown in FIGS. 5-7. For Sample 6 (FIG. 5), the impact modifier was present in domains having an average size of about 1 micrometer. For Samples 8 and 11 (FIGS. 6 and 7, respectively), however, the impact modifier was barely visible and thus had an average size of much lower than 1 micrometers.

Example 3

The components listed in Table 1 below are mixed in a Werner Pfleiderer ZSK 25 co-rotating intermeshing twin-screw extruder with a 25 mm diameter.

TABLE 1

| Ingredient | Wt. % |
|---|---|
| Black Concentrate | 2.5 |
| Glass Fiber | 30.0 |
| Crosslinking Agent 2 | 0.1 |
| Impact Modifier 2 | 6.0 |
| PPS 2 | 61.4 |

The pellets are also injection molded on a Mannesmann Demag D100 NCIII injection molding machine and tested for certain physical characteristics, as provided in Table 2 below.

TABLE 2

| Property | Value |
|---|---|
| Melt Viscosity (Pa-s) | 2,600 |
| Tensile Modulus (MPa) | 9,857 |
| Tensile Stress (MPa) | 140 |
| Tensile Break Elongation (%) | 2.03 |

TABLE 2-continued

| Property | Value |
|---|---|
| Charpy Notched Impact Strength (kJ/m$^2$) | 9.7 |
| DTUL (° C.) | 261 |

Example 4

The components listed in Table 3 below are mixed in a Werner Pfleiderer ZSK 25 co-rotating intermeshing twin-screw extruder with a 25 mm diameter.

TABLE 3

| Sample | A-1 | A-2 | A-3 | A-4 | A-5 |
|---|---|---|---|---|---|
| PPS 1 | 91.15 | 68.36 | 45.575 | 22.79 | — |
| PPS 3 | — | 22.79 | 45.575 | 68.36 | 91.15 |
| Impact Modifier 1 | 7.5 | 7.5 | 7.5 | 7.5 | 7.5 |
| Lubricant | 0.3 | 0.3 | 0.3 | 0.3 | 0.3 |
| Colorants | 1.05 | 1.05 | 1.05 | 1.05 | 1.05 |

The pellets were then molded into plaques in order to obtain the color measurements, which are summarized in Table 4 below.

TABLE 4

| Sample | A-1 | A-2 | A-3 | A-4 | A-5 |
|---|---|---|---|---|---|
| L* | 79.23 | 71.05 | 64.56 | 57.32 | 50.12 |
| a* | 4.7 | 5.09 | 5.47 | 5.09 | 4.93 |
| b* | 26.36 | 20.22 | 17.73 | 14.28 | 12.35 |
| C* | 26.78 | 20.85 | 18.55 | 15.16 | 13.36 |

As demonstrated by the data, in particular the chromaticity values, a color change can be achieved by altering the ratio of PPS 1 and PPS 3 (treated PPS) without the need to adjust the concentration of the colorants or any other additives.

These and other modifications and variations to the present disclosure may be practiced by those of ordinary skill in the art, without departing from the spirit and scope of the present disclosure. In addition, it should be understood the aspects of the various embodiments may be interchanged, either in whole or in part. Furthermore, those of ordinary skill in the art will appreciate that the foregoing description is by way of example only, and is not intended to limit the disclosure.

What is claimed is:

1. A crosslinkable polymer composition comprising:
a polyarylene sulfide;
from about 0.5 to about 50 parts of an impact modifier per 100 parts of the polyarylene sulfide, wherein the impact modifier includes an epoxy-functional polymer; and
from about 0.1 to about 15 parts of a crosslinking system per 100 parts of the polyarylene sulfide, wherein the crosslinking system includes a metal carboxylate.

2. The crosslinkable polymer composition of claim 1, wherein polyarylene sulfides constitute from about 40 wt. % to about 95 wt. % of the composition.

3. The crosslinkable polymer composition of claim 1, wherein the polyarylene sulfide is a polyphenylene sulfide.

4. The crosslinkable polymer composition of claim 1, wherein the polyarylene sulfide is functionalized.

5. The crosslinkable polymer composition of claim 1, wherein the epoxy-functional polymer contains an epoxy-functional (meth)acrylic monomeric component.

6. The crosslinkable polymer composition of claim 5, wherein the epoxy-functional (meth)acrylic monomeric component is formed from glycidyl acrylate, glycidyl methacrylate, or a combination thereof.

7. The crosslinkable polymer composition of claim 5, wherein the impact modifier further includes an α-olefin monomeric component.

8. The crosslinkable polymer composition of claim 1, wherein the metal carboxylate is a metal salt of a fatty acid.

9. The crosslinkable polymer composition of claim 8, wherein the salt contains a divalent metal cation.

10. The crosslinkable polymer composition of claim 8, wherein the fatty acid has a carbon chain length of from 8 to 22 carbon atoms.

11. The crosslinkable polymer composition of claim 1, wherein metal carboxylates constitute from about 0.05 wt. % to about 5 wt. % of the polymer composition.

12. The crosslinkable polymer composition of claim 1, wherein the crosslinking system further comprises a multi-functional crosslinking agent.

13. The crosslinkable polymer composition of claim 12, wherein the multi-functional crosslinking agent is a carboxylic acid.

14. The crosslinkable polymer composition of claim 12, wherein multi-functional crosslinking agents constitute from about 0.1 wt. % to about 10 wt. % of the polymer composition.

15. The crosslinkable polymer composition of claim 1, further comprising a heat stabilizer.

16. The crosslinkable polymer composition of claim 1, wherein the impact modifier is dispersed within the polymer composition in the form of discrete domains having an average size of from about 5 to about 800 nanometers.

17. The crosslinkable polymer composition of claim 1, further comprising an inorganic filler in an amount of from about 0.5 wt. % to about 50 wt. % of the composition.

18. A crosslinked product formed from the crosslinkable polymer composition of claim 1.

19. The crosslinked polymer product of claim 18, wherein the product exhibits a complex viscosity of 1,000 Pa-s or more, as determined by a parallel plate rheometer at an angular frequency of 0.1 radians per second, temperature of 310° C., and constant strain amplitude of 3%.

20. The crosslinked polymer product of claim 18, wherein the product exhibits a notched Charpy impact strength of about 10 kJ/m$^2$ or more, as determined at a temperature of 23° C. in accordance with ISO Test No. 179-1:2010.

21. The crosslinked polymer product of claim 20, wherein the product exhibits a notched Charpy impact strength of about 2 kJ/m$^2$ or more, as determined at a temperature of −30° C. in accordance with ISO Test No. 179-1:2010.

22. A method for forming a product, the method comprising melt blending a polymer composition that comprises a polyarylene sulfide, an impact modifier per hundred of the polyarylene sulfide, and a crosslinking system, wherein the crosslinking system includes a metal carboxylate and wherein the impact modifier includes an epoxy-functional polymer.

23. The method of claim 22, wherein the melt blending occurs at a temperature of from about 100° C. to about 400° C.

24. The method of claim 22, further comprising combining a multi-functional crosslinking agent with the polymer composition, and thereafter further melt blending the multi-functional crosslinking agent with the polymer composition.

25. A molded part comprising the polymer composition of claim 1.

26. A melt-extruded sheet comprising the polymer composition of claim 1.

27. A food tray comprising the polymer composition of claim 1.

28. The food tray of claim 27, wherein the tray contains a sidewall that extends upwardly from a lower wall to define a receptacle for one or more food products, wherein the sidewall, lower wall, or a combination thereof contain the polymer composition.

29. An overmolded structure comprising the polymer composition of claim 1 and a metal component.

* * * * *